United States Patent
Nylander et al.

(10) Patent No.: US 9,241,232 B2
(45) Date of Patent: Jan. 19, 2016

(54) METHOD AND APPARATUS FOR MACHINE COMMUNICATION

(75) Inventors: Tomas Nylander, Värmdö (SE); Ulf Ewaldsson, Lidingö (SE); Mikael Gudmundson, Sollentuna (SE)

(73) Assignee: Telefonaktiebolaget L M Ericsson (publ), Stockholm (SE)

(*) Notice: Subject to any disclaimer, the term of this patent is extended or adjusted under 35 U.S.C. 154(b) by 254 days.

(21) Appl. No.: 13/636,721

(22) PCT Filed: Apr. 20, 2010

(86) PCT No.: PCT/SE2010/050424
§ 371 (c)(1),
(2), (4) Date: Sep. 24, 2012

(87) PCT Pub. No.: WO2011/133073
PCT Pub. Date: Oct. 27, 2011

(65) Prior Publication Data
US 2013/0035066 A1    Feb. 7, 2013

(51) Int. Cl.
*H04W 4/00* (2009.01)

(52) U.S. Cl.
CPC ............... *H04W 4/00* (2013.01); *H04W 4/005* (2013.01)

(58) Field of Classification Search
CPC ... H04W 8/265; H04W 4/0015; H04W 4/005; H04W 4/00; H04W 4/001
USPC .................................. 455/418–420, 558, 551
See application file for complete search history.

(56) References Cited

U.S. PATENT DOCUMENTS

| | | | |
|---|---|---|---|
| 7,266,371 B1* | 9/2007 | Amin et al. | 455/419 |
| 8,195,235 B2* | 6/2012 | Montes | 455/558 |
| 2009/0037207 A1* | 2/2009 | Farah | 705/1 |
| 2011/0053575 A1* | 3/2011 | Veliu et al. | 455/418 |
| 2011/0250877 A1* | 10/2011 | Krause et al. | 455/419 |

FOREIGN PATENT DOCUMENTS

| | | |
|---|---|---|
| FR | 2850225 A1 | 7/2004 |
| GB | 2442565 A | 4/2008 |
| WO | 2004105421 A2 | 12/2004 |
| WO | 2005096649 A1 | 10/2005 |
| WO | 2009029155 A1 | 3/2009 |

* cited by examiner

*Primary Examiner* — Nam Huynh
(74) *Attorney, Agent, or Firm* — Murphy, Bilak & Homiller, PLLC

(57) ABSTRACT

A method, a Network Node and a machine is provided, wherein the machine initially is not provided with an identity which is valid for communication with the communication network. According to the method, the network receives an Activation Request (140, 352, 452, 552, 652) from a User Equipment (320, 420, 520, 620), which User Equipment has an identity which is valid in the communication network and which User Equipment is authenticated in the communication network, the Activation Request comprising a machine identity for the machine. An identity which is valid in said communication network for said machine is obtained (160, 354, 454, 555, 655) on the basis of the Activation Request being received from a User Equipment having a valid identity and being authenticated in the communication network. The obtained identity is transmitted (170, 360, 461, 564, 662) to the machine for enabling the machine to subsequently authenticate itself in one or more communication networks using the obtained identity.

25 Claims, 6 Drawing Sheets

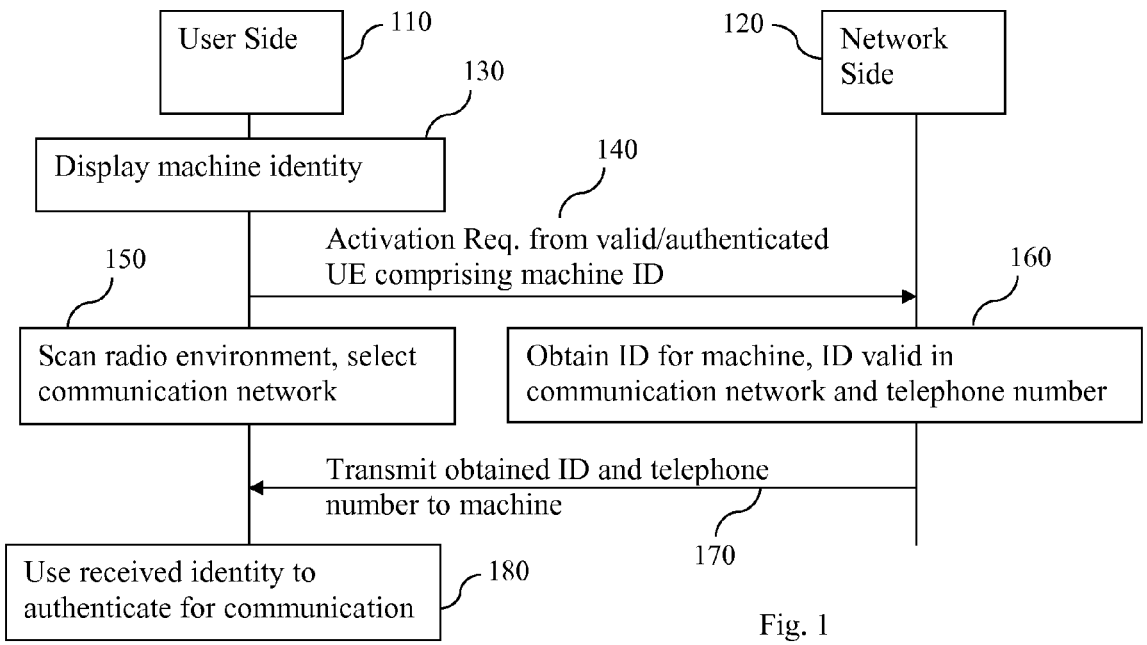
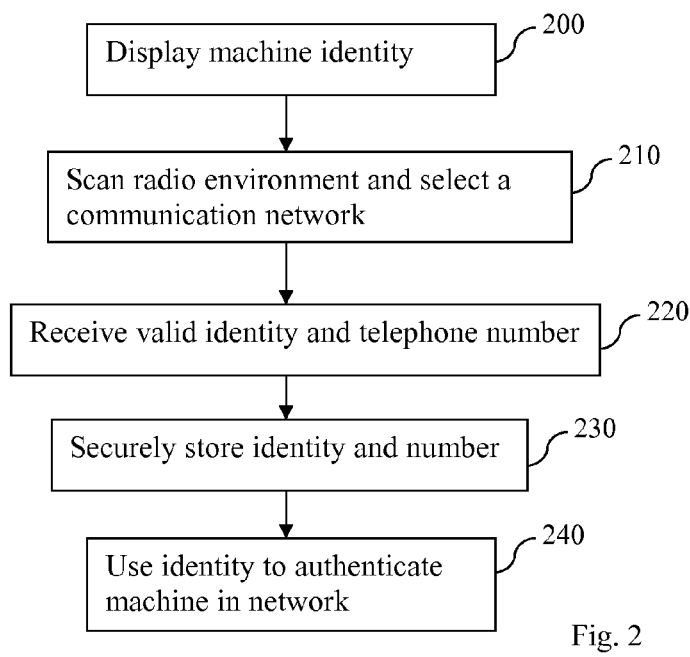

METHOD AND APPARATUS FOR MACHINE COMMUNICATION

TECHNICAL FIELD

The invention relates generally to methods, a machine and a network node for enabling communication between the machine and a communication network. More specifically, the invention relates to methods a machine and a network node, wherein an identity is generated in the communication network and transferred to the machine for enabling the machine to communicate with one or more communication networks using this generated identity.

BACKGROUND

In today's rapid technological development, it is getting more and more common to provide different kind of devices or machines with means for communication with a mobile communication network. This technological development is predicted to continue in the future as well. Consequently, more and more devices or machines, such as cameras, meters, cars, vending machines and so forth will in the future be provided with means for communication by means of a mobile communication network. In the following description, the term 'machine' will be used to represent any machine, device or equipment capable of communicating with a communication network.

In order for a machine to be able to communicate with or using a communication network, several requirements need to be fulfilled, some of which will be briefly outlined here. In addition to having a transmitter and a receiver, the machine needs to be associated with an identity which is valid in the communication network to which the machine desires to connect and use for communication. One reason for this is that the operator of the communication network in question will want to charge the machine for the communication that takes place, among other things.

A common standard today for providing a machine with an identity is to use a Subscriber Identity Module (SIM) or Universal Subscriber Identity Module (USIM). In other words, an operator of a mobile communication network provides an identity, credentials and operator specific information in a module or circuit card that is inserted into the machine. One example of such a module is the UICC, Universal Integrated Circuit Card.

However, there may arise some problems with inserting such a module or circuit card into a machine that is intended to be able to communicate using a mobile communication network. The machine may be very small with insufficient space to accommodate such a module, such as the UICC comprising the SIM/USIM or making the insertion of such a module difficult and cumbersome. It may also be necessary for a vendor of the device or machine to cooperate when inserting the module during production. Some cooperation between retailer and mobile operators may be required to provision the SIM/USIM at the point of sale.

Further, it becomes necessary to establish and administrate a subscription in relation to the SIM/USIM that is comprised in the UICC which is inserted into a machine.

The UICC is also relatively expensive since it includes a processor with secure computing and memory for storing of credentials.

In today's communication networks, a user equipment or mobile telephone or a portable computer such as a laptop is usually provided with a SIM/USIM. These devices have keyboards with multiple input possibilities. The devices or machines that may be provided with means for communication with/using a mobile communication network in the future may have more limited input possibilities, e.g. they may lack a keyboard.

Therefore, there is a need to simplify provisioning of an identity and related information to a device or machine. Discussions are ongoing in the industry on how to achieve this. However, solutions debated so far require a number of logical functions to handle the administration and cooperation between different players. This will likely make such solutions infeasible or impractical to use.

SUMMARY

An object of the invention is to address at least some of the problems outlined above. In particular, it is an object to enable communication between a machine and a communication network, which machine is not initially provided with an identity which is valid in the communication network. These objects and others may be obtained by providing a method, a network node and a machine according to the independent claims attached below.

According to one aspect, a method in a network node of a communication network for enabling communication between a machine and the communication network is defined. The method comprises the step of receiving an Activation Request from a User Equipment, which User Equipment has an identity which is valid in the communication network and which User Equipment is authenticated in the communication network. The Activation Request comprises a machine identity for the machine. The method further comprises the step of obtaining an identity which is valid in the communication network for the machine on the basis of the Activation Request being received from a User Equipment having a valid identity and being authenticated in the communication network. Further, the method comprises the step of transmitting the obtained identity to the machine for enabling the machine to subsequently authenticate itself in one or more communication networks using the obtained identity.

Different embodiments are possible in the method above.

In one embodiment, the identity being valid in a communication network is an IMSI.

In one embodiment, the machine identity is a MAC address or an IMEI.

In yet an embodiment, the Activation Request is an SMS message.

In another possible embodiment, a telephone number, such as an MSISDN, also is requested in the Activation Request and is obtained together with the identity which is valid in the communication network for the machine.

In one embodiment, the steps of the method are performed by an Activation Server in the communication network.

According to one embodiment, the transmitting of the obtained identity, and optionally the telephone number, to the machine comprises sending a Configuration Response Message, comprising the identity, and optionally the telephone number, to the machine.

In yet possible embodiments, the method further comprises the step of the communication network receiving a Configuration Attach Message from the machine indicating a request for configuration from the machine, the Configuration Attach Message comprising the machine identity.

According to yet possible embodiments, the method further comprises the step of the communication network receiving a PDP Context Activation for configuration bearer service.

In one embodiment, the Configuration Attach Message indicates both Attach Type and Request Type to be 'Configuration' and comprises an APN.

According to one embodiment, the communication network is selected by the machine scanning a radio environment and selecting an available communication network.

In one embodiment, the communication network is selected by a user of the User Equipment, the selected communication network being a home network of the User Equipment.

In yet one embodiment, the method further comprises establishing a bearer between the machine and the Activation Server.

According to an embodiment, the Activation Request comprises a string of text to be associated with the obtained identity and/or the obtained telephone number.

In one embodiment, the method further comprises the step of, receiving a Configuration Request Message from the machine, the Configuration Request Message comprising the machine identity, wherein the machine identity may optionally be encrypted using a PIN, which PIN was comprised in the Activation Request.

According to yet one embodiment, the method comprises the step of, after the obtaining an identity which is valid in the communication network, and optionally the telephone number, is complete, transmitting the obtained identity, and optionally the telephone number, to the machine by sending a Configuration Response Message, comprising the identity and optionally the telephone number, to the machine.

In one embodiment, the method further comprises the steps of, after the identity which is valid in the communication network, and optionally the telephone number, has been obtained in the communication network, sending a Paging Message on a paging channel, the Paging Message comprising the machine identity, and when a Paging Response from the machine, having the machine identity as in the Paging Message, is received, transmitting the obtained identity, and optionally the telephone number, to the machine.

In yet one embodiment, the method further comprises the step of associating the machine to the User Equipment in such a way that any subsequent chargeable communication or activity between the machine and the communication network is billed to an owner of the User Equipment.

According to one possible embodiment, the method further comprises the step of sending a Confirmation Message to the User Equipment from which the Activation Request was received, the Confirmation Message comprising the obtained identity which is valid in the communication network for the machine and/or optionally the telephone number.

In one embodiment, the Activation Request and/or the Configuration Request message comprise a string of text to be associated with the obtained identity and/or the obtained telephone number.

According to another aspect, a method in a machine is provided, for enabling communication between the machine and a communication network, which method comprises the steps of displaying at the machine, a machine identity, which identity is unique for the machine, scanning a radio environment, displaying available communication networks and selecting a communication network. The method further comprises the steps of receiving at the machine, an identity which is valid in the communication network, and optionally a telephone number such as an MSISDN, for the machine, securely storing the received identity, and using the received identity to authenticate the machine in one or more communication networks using the received identity.

In one embodiment, the received identity which is valid in the communication network is an IMSI.

In yet one embodiment, the machine identity is a MAC address or an IMEI.

According to another aspect, a Network Node is provided, which is adapted for obtaining an identity for a machine, the identity being valid in a communication network. The Network Node comprises a receiving unit adapted for receiving an Activation Request comprising a machine identity, the Activation Request being sent from a User Equipment, which User Equipment has an identity valid in a communication network and which User Equipment is authenticated in the communication network. The Network Node further comprises an obtaining unit adapted for requesting and obtaining an identity which is valid in the communication network and related information for the machine from the communication network on the basis of the Activation Request being received from a User Equipment having a valid identity and being authenticated in the communication network. The Network Node also comprises a transmitting unit for transmitting the obtained identity to the machine.

In one embodiment, the identity being valid in a communication network is an IMSI.

In one embodiment, the machine identity is a MAC address or an IMEI.

In yet one embodiment, the Activation Request is an SMS message.

In one embodiment, the obtaining unit is further adapted for requesting and obtaining a telephone number, such as an MSISDN, for the machine on the basis of the Activation Request being received from a User Equipment having a valid identity and being authenticated in the communication network.

According to yet another aspect, a machine is provided. The machine is adapted to receive a downloadable identity, which identity is valid in a communication network. The machine comprises a communication unit and a memory for securely storing the downloaded identity. The machine also has a unique machine identity, wherein the machine comprises a display unit adapted to display the machine identity, and to communicate with the communication network to receive an identity which is valid in the communication network.

In one embodiment, the downloadable identity which is valid in a communication network is an IMSI.

In yet one embodiment, the machine identity is a MAC address or an IMEI.

According to one embodiment, the machine is further adapted to receive a downloadable telephone number, such as an MSISDN.

BRIEF DESCRIPTION OF DRAWINGS

The invention will now be described, by way of example, with reference to the accompanying drawings, in which:

FIG. 1 is a signaling diagram illustrating an embodiment of a method for enabling communication between a machine and a communication network.

FIG. 2 is a flowchart illustrating an embodiment of a method for enabling communication between a machine and a communication network.

DETAILED DESCRIPTION

Figure 3:
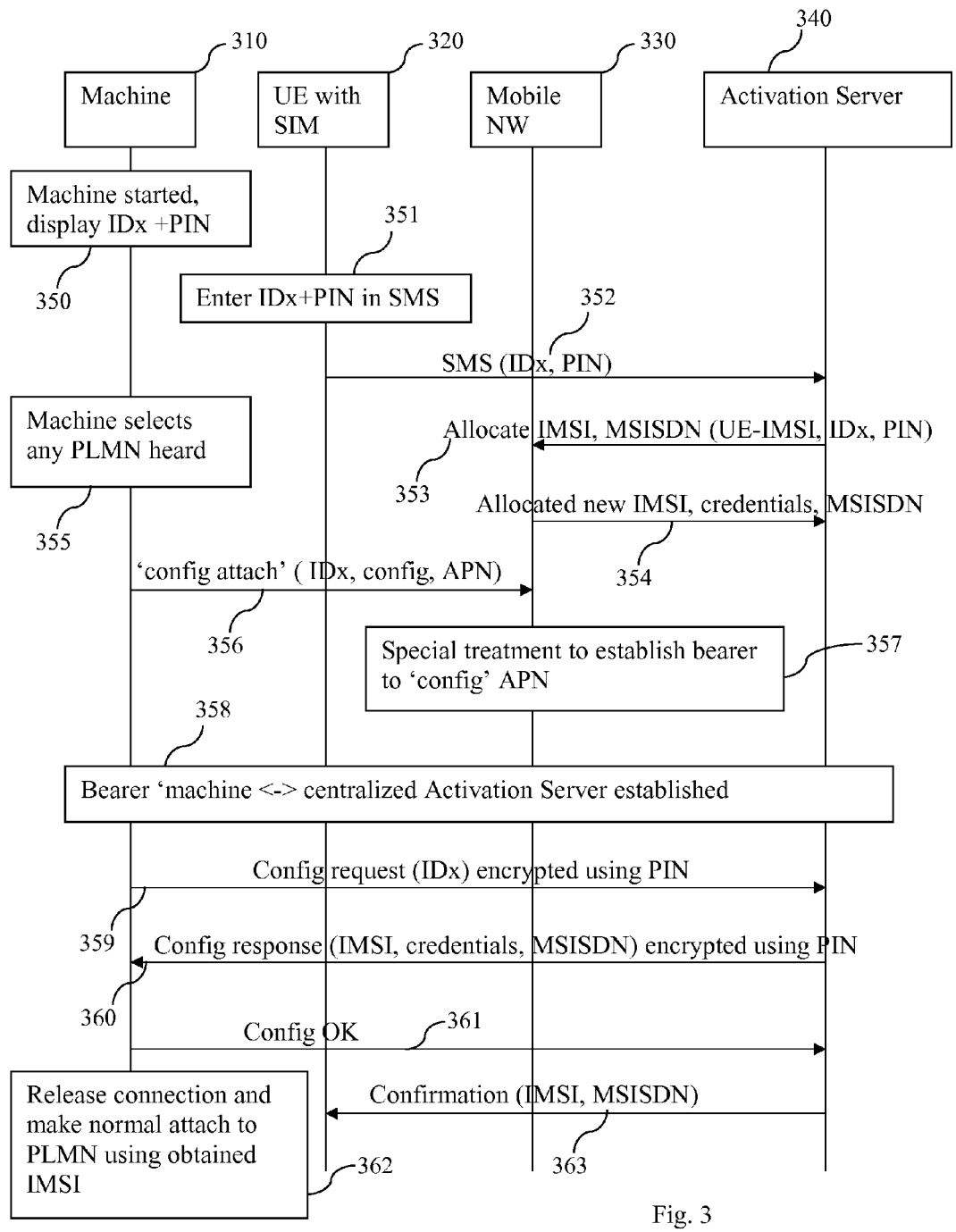
FIG. 3 is a signaling diagram illustrating an embodiment with a centralized Activation Server, with machine initiated connection in the user plane.

This solution may be used to address at least some of the problems outlined above. In particular, this solution may be used for enabling communication between a machine and a communication network, wherein the machine is not initially provided with an UICC comprising a SIM and/or IMSI (International Mobile Subscriber Identity). This solution further provides a Network Node such as an Activation Server in a communication network for obtaining an identity for a machine, wherein the identity is valid in one or more communication networks.

The invention benefits from the fact that an end user, having a User Equipment which is authenticated in a communication network, has some sort of business arrangement with the operator of the communication network. The business arrangement usually comprises that the end user has a subscription of some form with the operator of the communication network. By this business arrangement, the communication network/operator may trust the end user to expand the business arrangement to incorporate further equipments, such as for example a machine. The end user may hereinafter be referred to as the owner or simply the user throughout the detailed description.

FIG. 1 is a signaling diagram illustrating an embodiment of a method for enabling communication between a machine and a communication network. It shall be noted that FIG. 1 is a schematic signaling diagram of an embodiment of the method, illustrating the User Side 110 and the Network Side 120 also referred to as 'the network' in relation to FIG. 1. The User Side 110 comprises a machine and a valid User Equipment. The expression a 'valid' User Equipment means a User Equipment that is authenticated in a communication network, meaning also that the end user of the User Equipment has some sort of business arrangement with the operator of the communication network. The Network Side 120 comprises a communication network and an Activation Server.

FIG. 1 illustrates that a machine displays 130 its machine identity. FIG. 1 then illustrates how the network 120 receives an Activation Request 140 from a User Equipment, which User Equipment has an identity (hereinafter referred to as UE-identity) which is valid in the communication network 120 and which User Equipment is authenticated in the communication network. The Activation Request 140 comprises a machine identity for the machine. The machine and the User Equipment are of course part of the User Side 110 in FIG. 1.

As the Network Side 120 receives the Activation Request 140, an identity which is valid in the communication network for the machine is obtained 160 on the Network Side on the basis of the Activation Request 140 being received from a User Equipment having a 'valid identity' and being authenticated in the communication network 120. A 'valid identity' means that the identity in a way represents some sort of business arrangement between the operator of the communication network and the end user who is in possession of the User Equipment being associated with the identity. In other words, the 'valid identity' can be used to authenticate an equipment/machine/device in a communication network.

As the User Equipment which has sent the Activation Request 140 has a valid identity and is authenticated in the communication network 120, the network is able to trust that the Activation Request 140 is valid and also that the machine in need of a valid identity is somehow associated with the owner of the User Equipment. Presumably, the owner of the User Equipment is also the owner of the machine. Of course, this need not be the case, but the owner of the User Equipment in a way guarantees or certifies that the machine in question is reliable and entitled to be provided with an identity which is valid in the communication network 120.

The machine scans 150 the radio environment to detect available communication networks and a communication network is selected. As the identity for the machine has been obtained in the communication network 120, the identity is transmitted 170 to the machine, thereby enabling the machine to subsequently authenticate itself in one or more communication networks 120 using the obtained valid identity As the machine has received the obtained identity, the machine may use the identity to authenticate itself for communication in one or more communication networks 120.

As the machine receives 170 the obtained identity, the identity has to be securely stored in a memory within the machine so that the identity is safe and protected from tampering with, from cloning or from being abused in other ways.

According to an embodiment, the identity which is valid in a communication network is an IMSI.

In one example, the machine identity is a MAC (Media Access Control) address or an IMEI (International Mobile Equipment Identity).

According to an embodiment, the Activation Request is communicated in an SMS message.

According to an embodiment, the Activation Request 140 further indicates a request for a telephone number, such as an MSISDN. If the Activation Request indicates such a request, a telephone number/MSISDN is obtained 160 together with the identity which is valid in the communication network for the machine. This MSISDN is then transmitted 170 to the machine together with the identity which is valid in the communication network for the machine.

In this embodiment, when the machine has obtained a telephone number, it may be reached over a communication network by other User Equipments or the like. Some examples of being reachable are that it is possible to establish a session to the machine or sending messages or data to the machine.

The indication that a telephone number is requested or needed may be implemented in different ways. In one example, the user or owner of the machine and the User Equipment specifically enters such a request or indication into the Activation Request which is then analyzed by the network. In another example, the Activation Request in itself is a request or indication that both an identity and a telephone number are requested and the user or owner of the User Equipment only enters the machine identity into the Activation Request.

In other embodiments, when the machine will not be provided with a telephone number, it won't be reachable over a communications network by other User Equipments or the like. Instead, the machine will be restricted to only send messages, place calls, generate data communication or the like.

According to an embodiment, the communication network 120 comprises an Activation Server which receives the Activation Request and performs the methods of the procedure. The features and functions of the Activation Server will be further described later.

In one example, the transmitting 170 of the obtained identity, and optionally a telephone number if it was requested in the Activation Request, to the machine comprises sending a Configuration Response Message, comprising the identity and optionally the telephone number, to the machine. It shall be noted that the Configuration Response Message may or may not correspond to any other possible message which is defined in any existing standard having the same name.

In another example, the procedure further comprises the step of the communication network receiving a Configuration Attach Message from the machine indicating a request for configuration from the machine. The Configuration Attach Message comprises the machine identity.

In order for the network to be able to transfer or transmit the obtained identity to the machine, and possibly the telephone number, a bearer may be required. Such a bearer should be set up between the machine and the Activation Server, which is to transmit the obtained identity, and possibly the telephone number to the machine. In order to set up such a bearer, which is specific for the transmitting of the obtained identity to the machine, the machine requests the establishment of such a bearer in the Configuration Attach Message. This procedure may be similar to when an entity, not having an IMSI, in a communication network desires to use an Emergency Service.

According to one embodiment, in case the procedure is implemented in a third generation (3G) system, the procedure further comprises the step of the communication network receiving a PDP Context Activation for configuration bearer service. This is performed after the network receives the Configuration Attach Message from the machine indicating a request for configuration from the machine.

According to another embodiment, the Configuration Attach Message indicates both Attach Type and Request Type to be 'Configuration' and comprises an Access Point Name (APN).

In case the procedure is implemented in an LTE system (Long Term Evolution), no specific PDP Context Activation Message is used as in the 3G case. Instead, the Configuration Attach Message has two indicators, Attach Type and Request Type, which indicate the type of bearer that is requested. In this case, both indicators are set to 'Configuration'.

The APN identifies which communication network the machine wants to communicate with. In addition to identifying the communication network, the APN is also used to define the type of service that is requested. In this case, a request for configuration. In this way, the network will know what kind of bearer is needed, or is requested, to be set up and also between which "communication nodes", the machine and the Activation Server in this scenario.

According to an embodiment, the communication network is selected by the machine scanning a radio environment and selecting an available communication network.

In this embodiment, the Activation Server is implemented in a centralized manner. This means that several operators or communication networks may share the same Activation Server. If this is the case, it does not matter if the User Equipment is currently roaming in a communication network which is not the home network of the User Equipment. As the Activation Server is implemented in a centralized manner, the User Equipment may always reach the Activation Server, even when roaming in communication networks of other operators, provided that those communication networks share the Activation Server.

According to another embodiment, the communication network is selected by an end user of the User Equipment, wherein the selected communication network is a home network of said User Equipment.

In this embodiment, the Activation Server is implemented within the operator's own communication network. This means that the procedure for enabling communication between the machine and the communication network must take place in the home network, as the Activation Server is not reachable for the User Equipment and/or the machine when roaming in communication networks of other operators.

According to an example, the procedure further comprises the step of establishing a bearer between the machine and the Activation Server.

As the network has received either the Configuration Attach Message from the machine indicating a request for configuration from the machine and a subsequent PDP Context Activation for configuration bearer service, or, the Configuration Attach Message from the machine with both Attach Type and Request Type being set to 'Configuration', a configuration bearer can be set up between the machine and the Activation Server.

According to an embodiment, the procedure further comprises the step of receiving a Configuration Request Message from the machine. The configuration request message comprises the machine identity, wherein the machine identity may optionally be encrypted using a PIN, which PIN was comprised in the Activation Request.

The Activation Request may comprise a PIN together with the machine identity. This PIN may then be used to encrypt messages, data in messages and/or communication between the machine and the Activation Server. As the bearer is established, the machine starts an activation protocol in order to receive the obtained identity. The machine therefore sends a Configuration Request to the Activation Server, optionally encrypted using the PIN.

In an example, after the identity which is valid in the communication network is obtained in the communication network, and optionally also the telephone number, the procedure comprises the step of transmitting the obtained identity and telephone number to the machine by sending a Configuration Response Message, comprising the identity and telephone number, to the machine.

According to an embodiment, after the process of obtaining or allocating an identity which is valid in the communication network, and optionally the telephone number, is complete, the procedure further comprises the steps of: sending a paging message on a paging channel, the paging message comprising the machine identity, and when a paging response from the machine, having the machine identity as in the paging message, is received, transmitting the obtained identity, and optionally the telephone number, to the machine.

As stated before, when the machine receives the identity which is valid in the communication network, the machine stores the identity in a secure manner. If a telephone number has been transmitted to the machine together with the valid identity, this telephone number is also securely stored in the machine. Also, the connection is released and then the machine may subsequently perform a normal or regular attach to the communication network using the obtained identity.

In the case that a telephone number was requested, the machine can be arranged to display the telephone number when it has been received by the machine from the communication network. In the case that a telephone number was not requested, the machine can be arranged to display the IMSI when it has been received by the machine from the communication network.

In one example, the network will also send a confirmation, for example by an SMS, to the User Equipment that was used to send the Activation Request. The confirmation may comprise merely an indication that the machine has been successfully provided with an identity. Alternatively, the confirmation may comprise the obtained identity for the machine. In case a telephone number was requested and obtained, the confirmation may advantageously comprise the telephone number that was obtained for the machine.

According to an embodiment, the procedure further comprises the step of associating the machine to the User Equipment in such a way that any subsequent chargeable communication or activity between the machine and the communication network is billed or charged to an owner of the User Equipment.

In the most presumable case, when the owner of the User Equipment is also the owner of the machine, the machine will be tied or associated with the owner, or end user, of the User Equipment. Thereby, as some sort of business association already exists between the owner and the operator, e.g. by means of a subscription, this business association may be extended to incorporate the machine and a supplementary identity allocated thereto. This way, the owner or end user may be provided with or receive one single bill for both the User Equipment and for the machine.

In one example, the user may enter a string of text together with the machine identity in the Activation Request that is sent from the User Equipment to the network. This string of text can then be used when associating the machine to the User Equipment. The string of text can advantageously appear on the bill, in association with the specific costs generated by the machine, which bill the user/owner receives from the operator with which the user/owner has a subscription for the User Equipment. Then it is easy for the user/owner to identity which equipment (the machine or the User Equipment) that generated the different costs on the bill. The user may have several machines tied to his/her User Equipment and it would be advantageous if the user could easily identity which machine generated which costs as well as to identify which costs on the bill was generated by the User Equipment. Alternatively, the machine could automatically include a string of text to identify the type of machine in the Configuration Request Message. For example, in the case the machine is a camera, the machine could include the make and model, which will then appear on the bill to owner as described above.

According to an embodiment, the procedure further comprises the step of sending a Confirmation Message to the User Equipment from which the Activation Request was received. The Confirmation Message comprises the obtained identity which is valid in the communication network for the machine and optionally the telephone number.

FIG. 2 is a flow chart illustrating an embodiment of a procedure for enabling communication between a machine and a communication network. It shall be noted that FIG. 2 illustrates a procedure in the machine and does not illustrate what takes place in the network side.

According to this procedure, the machine displays 200 a machine identity, which identity is unique for the machine.

The displayed identity may be read by a user of a User Equipment so that the user may enter this identity to an Activation Request to be sent to a communication network. This in not illustrated in FIG. 2.

The machine scans 210 a radio environment and displays available communication network and a communication network is selected.

The Activation Request may optionally indicate to the communication network that not only is an identity which is valid in the communication network requested, but also a telephone number, such as an MSISDN, is requested.

The machine receives 220 an identity which is valid for communication in the one or more communication networks and securely stores 230 this received identity. Here, a telephone number will be received together with the identity, provided that a telephone number was requested. If a telephone number was not requested in the Activation Request, the machine will only receive the identity which is valid for communication in the one or more communication networks.

Then the machine may then use 240 this received identity to authenticate itself in a communication network for communication in the network.

According to an embodiment, the identity which is valid in a communication network is an IMSI.

In one example, the machine identity is a MAC (Media Access Control) address or an IMEI (International Mobile Equipment Identity).

Figure 4:
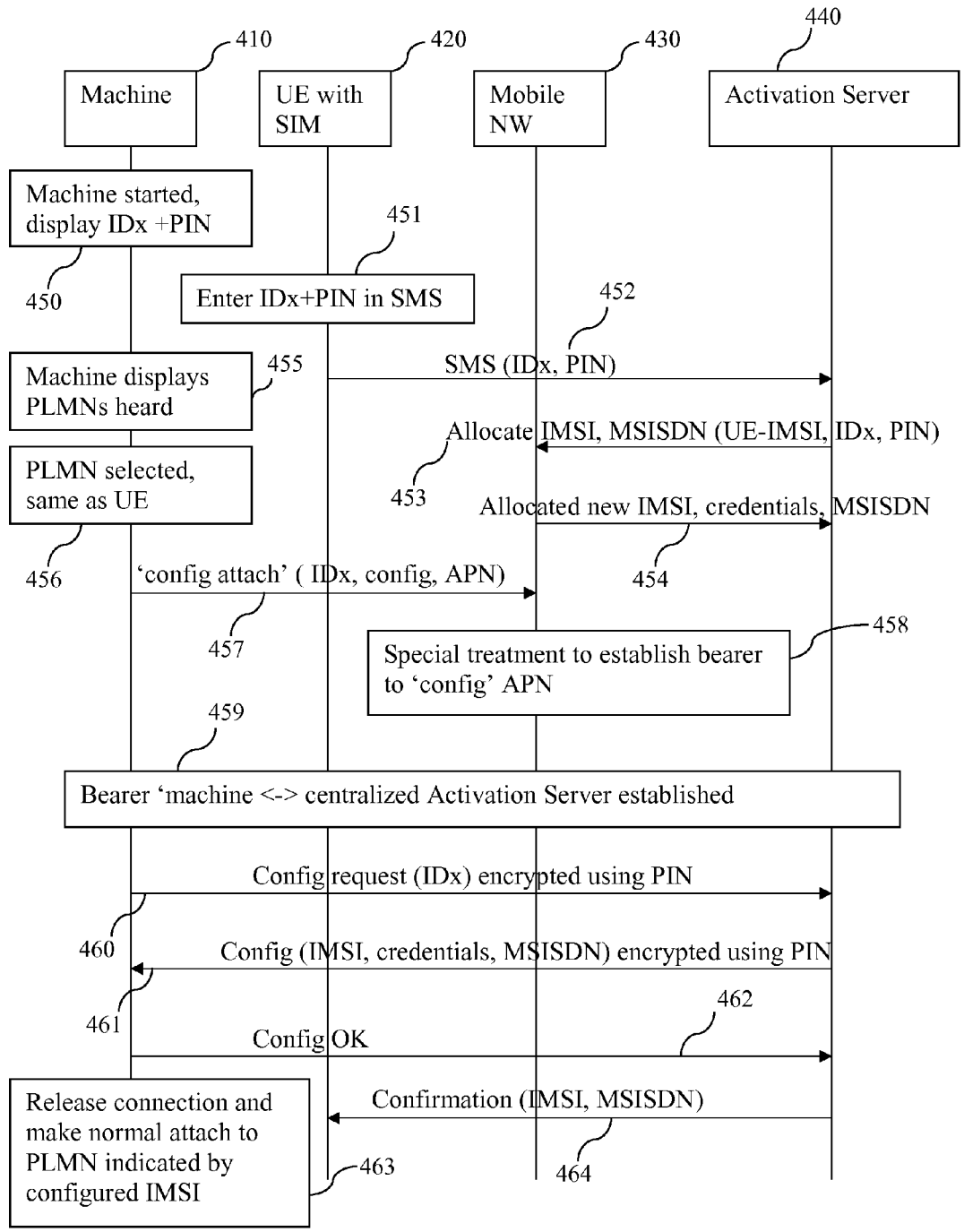
FIG. 4 is a signaling diagram illustrating an embodiment with an operator specific Activation Server, with machine initiated connection in the user plane.
Figure 5:
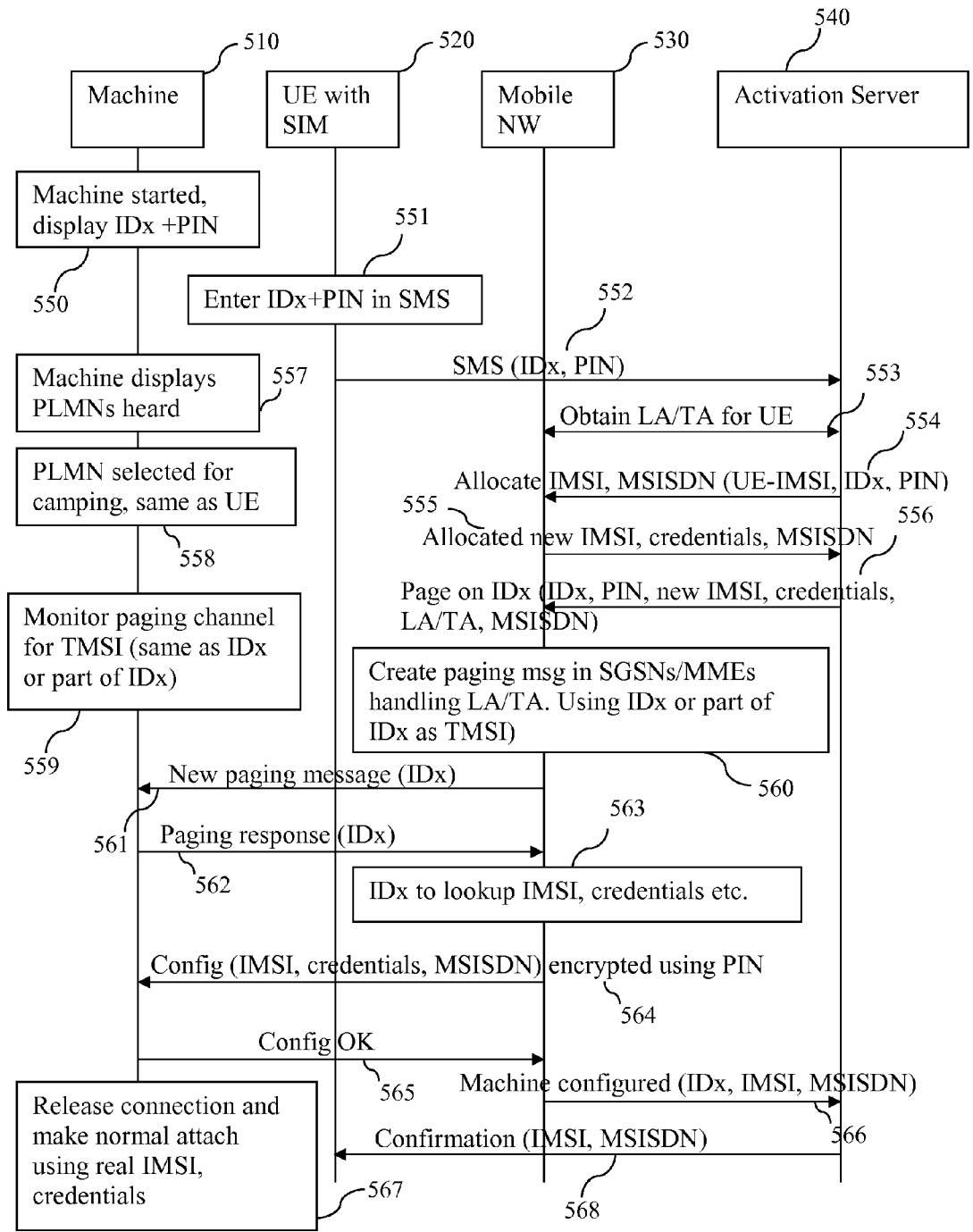
FIG. 5 is a signaling diagram illustrating an embodiment with network initiated connection, in the control plane.

FIGS. 3, 4 and 5 all illustrate different embodiments of the procedure. Some features are common for all embodiments while other features differ as will be described.

FIG. 3 illustrates an embodiment with a centralized Activation Server 340, and involving a machine initiated connection in the user plane. In this embodiment, several operators having their own communication networks share a common or centralized Activation Server 340. This means that a User Equipment 320 equipped with a SIM/USIM may be currently camping on any communication network sharing the Activation Server 340 in question with the home network of the User Equipment 320, when performing the procedure. The User Equipment has been authenticated in the home network for communication.

In all embodiments illustrated in FIGS. 3-5, the User Equipment 320, 420, 520, 620 has been configured with a destination number to the Activation Server 340. This configuration can be performed in various ways. One example is that the User Equipment has received a configuration SMS, also known as an Over-The-Air (OTA) configuration SMS. Also, in FIGS. 3-5, MSISDN is used as the telephone number. In these figures, it is illustrated that an MSISDN is requested, however, this is not compulsory as have been described above. Further, in FIGS. 3-5 the identity which is valid for communication in one or more communication networks is represented by an IMSI. Further, in these figures, the Activation Request is in the form of an SMS. It shall be noted that this is merely examples of embodiments. Further, some of the names of the messages are shortened in the figures, for example 'Configuration Request Message' is called 'Config request' in respective figures.

FIG. 3 illustrates that the machine 310 is activated 350 and that the machine displays its identity, IDx, and also a PIN code associated with it.

The identity, IDx, is an identity which is unique for the machine. It may e.g. be programmed into a memory in the machine at the manufacture of the machine. It could be e.g. an IMEI or a MAC address of the equipment. The IMEI has the characteristic that is has a structure similar to IMSI. The machine could possibly also display a PUK (Personal Unblocking Key).

The end user, most presumably the owner of the User Equipment, enters 351 the IDx and also the PIN code into an Activation Request, in this example an SMS. The SMS will hereinafter also be referred to as the Activation SMS. The user may possibly also enter a string of text.

The Activation SMS may optionally also indicate a request for a telephone number, such as an MSISDN. This will indicate to the network that not only is an identity which is valid for communication in the communication network requested, but also a telephone number.

The SMS is then sent 352 to the Activation Server 340. As the Activation Server 340 receives the SMS, it knows that the SMS comes from an authenticated User Equipment 320 because the User Equipment is equipped with a SIM/USIM with which the User Equipment is associated with an operator, presumably by a subscription. Therefore, the Activation Server 340 knows that the user of the User Equipment 320 is a legitimate user. In more detail, the Activation Server may enquire the home network of the User Equipment if there exists a subscription for the IMSI comprised in the SIM/USIM or in other way ascertain that the Activation SMS is received from a User Equipment having a valid identity and which User Equipment is authenticated in the communication network.

The Activation Server 340 may then initiate a procedure for obtaining an IMSI, and optionally an MSISDN if it was requested, for the machine. The Activation Server 340 requests 353 an IMSI, related information, and an MSISDN, for the machine from the appropriate communication network 330 or PLMN (Public Land Mobile Network). The related information that is requested together with the IMSI is any data that is needed for a SIM/USIM. The appropriate network 330 would be the home network of the User Equipment. As the Activation Server 340 is shared or centralized, the Activation Server may communicate with all the different communication networks that share the Activation Server. In most cases, it is the home network of the User Equipment 320 that resolves or allocates the IMSI and the MSISDN for the machine 310, which IMSI is valid for subsequent communication with the communication network. When selecting the correct or appropriate communication network, the IMSI of the User Equipment 320 which was used to send the Activation SMS may be analyzed.

In case it is not the home network of the User Equipment 320 that resolves or allocates the IMSI, and the MSISDN, for the machine 310, the method may be implemented such that a virtual operator is created, which all the other cooperating operators make use of. This virtual operator, MVNO (Mobile Virtual Network Operator), will have an Activation Server, an AuC (Authentication Centre), an HLR (Home Location Register)/HSS (Home Subscriber Server), and possibly also an EIR (Equipment Identity Register). In such a case, the identity which is valid for authentication and communication with one or more communication networks is allocated in the HLR/HSS of the MVNO, as well as the MSISDN if it was requested. This solution may be desirable in case the cooperating operators do not wish a central server, such as the Activation Server, to communicate with their respective HLR/HSS.

In case it is the home network of the User Equipment which resolves or allocates the IMSI for the machine and also the MSISDN, the requesting of an IMSI, related information and MSISDN could be done using automated O&M (Operation & Maintenance) interfaces towards the mobile network nodes, for example, like when allocating a new subscriber in HLR (Home Location Register)/HSS (Home Subscriber Server)/AuC (Authentication Centre). Alternatively, the requesting of an IMSI, related information and MSISDN could be done using new interfaces and/or protocols.

The obtained IMSI should also be tied or associated to the IMSI of the User Equipment 320 which was used to send the Activation SMS, since the end user or the owner of the User Equipment 320 which was used to send the Activation SMS most presumably is the end user or the owner of the machine 310. Also the MSISDN and the IMSI are associated. If the machine is later used such that it somehow communicates with the communication network, generating chargeable activities, the end user may be charged for the communication on the same bill as for his/her User Equipment. He/she may alternatively be charged on a separate bill, but in any case, the chargeable activities that may take place using the machine should be charged to the owner of the User Equipment which was used to send the Activation SMS. If a string of text was entered in the Activation Request or in the Configuration Request Message, this string of text may also be used when the different associations or ties between the User Equipment, the obtained IMSI and MSISDN are performed.

As stated before, when the machine is switched on or activated, it displays its machine identity and PIN and possible also a PUK. As the machine has received the obtained identity which is valid for authentication and communication with one or more communication networks, the obtained identity is securely stored in a memory within the machine. Thereafter, the machine will at some point in time be deactivated or switched off. Then, according to an example, the machine could behave as having a normal UICC with a SIM/USIM application, for example, if the machine has been configured with a valid identity, the next time the machine is activated, it will not display its PIN and machine identity, but instead it could be configured to request the user to enter the PIN. If this is the case, then after the user has entered the PIN, the machine will authenticate and attach itself with a communication network. This procedure is similar, if not identical, to the procedure when a User Equipment is activated, or switched on, requesting a PIN before being fully activated and operational. In other words, the machine can be arranged to function as a regular User Equipment once the machine has received and securely stored an identity and possibly also an MSISDN provided an MSISDN was requested.

Although not shown in FIG. 3, the IDx (for example the IMEI or the MAC address) could be added to the EIR (Equipment Identity Register) or other database used for this feature. Also the tie or association between the machine 310 and the User Equipment 320 which was used to send the Activation SMS could be established at this point.

FIG. 3 illustrates that the Activation Server 340 receives 354 the resolved or allocated IMSI, related information, such as e.g. credentials and MSISDN, and then the Activation Server 340 waits for a connection, such as a bearer, to be set up between the Activation Server and the machine. Note that it is one or more nodes in a communication network that resolves or allocates the identity as well as the MSISDN. Then, the Activation Server obtains this resolved or allocated identity from the node or nodes. As a consequence, in the description hereinafter, this identity may be referred to as the "obtained" identity, the "resolved" or "allocated" identity depending on the context in which the identity is mentioned.

At some point independent of steps 351-354, the machine 310 scans the radio environment and selects 355 an available communication network. As the Activation Server 340 is shared between several operators or communication networks, the User Equipment 320 may be camping on any communication network sharing or having access to the Activation Server 340.

In order for the Activation Server 340 to be able to transmit the obtained identity and the MSISDN to the machine 310, a bearer is required or needed in this embodiment. Such a bearer is to be set up between the machine 310 and the Activation Server 340, which is to carry the obtained identity and MSISDN to the machine. In order to set up such a bearer, which is specific for the transmitting of the obtained identity and MSISDN to the machine, the machine 310 requests the establishment of such a bearer in a Configuration Attach Message 356. This procedure can be compared to when an entity, not having an IMSI, in a communication network desires to use en Emergency Service. Hence, the machine sends a Configuration Attach Message, also called a 'config attach' to the selected communication network. The machine supplies its identity, IDx, and indicates that a configuration is needed.

In the embodiment illustrated in FIG. 3, the machine 310 also supplies an APN in the Configuration Attach Message 356 to the selected communication network. As described above, the APN indicates to the network what kind of bearer is to be set up, and between which nodes. In this case, a bearer for configuration is requested to be set up between the machine 310 and the Activation Server 340.

In the case that the communication network that is selected is not part of the ones who share the Activation Server 340, the bearer cannot be set up, as the selected communication network will not know how to handle the received Configuration Attach Message 356. In such a case, the machine 310 will need to select another communication network and try again.

In FIG. 3, the selected communication network 330 is part of the ones who share the Activation Server 340 and hence, knows how to handle the APN. This is illustrated in FIG. 3 by 357. Consequently, a bearer is established 358 between the machine and the Activation Server. This way, the two parties are able to communicate with each other.

The machine 310 then starts an activation protocol and sends a Configuration Request Message 359 to the Activation Server 340. The Configuration Request Message comprises the IDx and the IDx may potentially be encrypted using the PIN. The PIN was received in the Activation SMS 352 so the Activation Server 340 can decrypt the IDx. In one embodiment, the Configuration Request Message 359 also comprises a string of text, which can be used to identify the type of machine. This information will then advantageously appear on the bill to the owner in association with the specific costs that have been subsequently generated by actions undertaken by the machine in one or more communication networks.

As the Activation Server 340 recognizes the IDx, it supplies the obtained IMSI and related information, such as credentials, as well as the MSISDN to the machine in a Configuration Response Message 360. Also in this message, the IMSI, the related information and the MSISDN may be encrypted using the PIN.

The machine 310 acknowledges the configuration by sending a Configuration Acknowledge Message 361 to the Activation Server 340.

Then the connection or bearer is released 362. The machine 310 now has an IMSI which is valid for communication in the communication network, and in other communication networks in the same manner as for the User Equipment 320. After the connection or bearer has been released, the machine may perform a normal attach to the communication network, using the obtained IMSI and credentials. Any chargeable action the machine 310 performs may then be billed to the owner or end user of the User Equipment 320, and hence the machine. As described above, the machine may also have an MSISDN so that other entities or User Equipments may somehow reach the machine by establishing a session or sending a message or the like to the machine by using the MSISDN as destination address.

FIG. 3 also illustrates that a Confirmation Message is sent 363 to the User Equipment which was used to send the Activation Request. The Confirmation Message comprises the obtained IMSI and MSISDN.

FIG. 4 illustrates another embodiment of the procedure, in which the Activation Server 440 is operator specific. In other words, in this embodiment, every operator supporting the procedure, has its own Activation Server 440. This means that when the procedure is performed, the User Equipment 420 needs to be camping on the home network of the User Equipment.

The embodiment illustrated in FIG. 4 comprises the same first steps 450-452 as steps 350-352 in FIG. 3. In short and simplified, that is, the User Equipment 420 has been configured with a destination number to the Activation Server 440. The machine 410 is started or activated and the machine displays its identity IDx and also a PIN code associated with it. The end user enters 451 the IDx and also the PIN code into an SMS. The SMS is sent 452 to the Activation Server 440. As the Activation Server receives the SMS, it knows that the SMS comes from an authenticated User Equipment 420, the Activation Server 440 knows that the user of the User Equipment is a legitimate user.

The Activation Server 440 may then initiate a procedure for obtaining an IMSI for the machine and optionally also an MSISDN. The Activation Server requests 453 an IMSI, related information and an MSISDN for the machine 410 from the communication network 430. In this example, the communication network 430 is the home communication network for the User Equipment 420.

The requesting of an IMSI and related information is performed as described in relation to FIG. 3. Also the resolved or allocated IMSI should be tied or associated to the IMSI of the User Equipment 420 which was used to send the Activation SMS 452 as described above.

The machine 410 scans the radio environment and displays 455 a list of available communication networks or PLMNs. As each operator or communication network has its own Activation Server 440, the end user selects a communication network 430 from the displayed list, which network is the same as home communication network of the User Equipment 420. Here, this embodiment differs in this respect from the embodiment described above in relation to FIG. 3.

In order for the network to be able to transmit the obtained identity 454 to the machine 410, as well as the MSISDN, a bearer is required also in this embodiment. Such a bearer is to be set up between the machine 410 and the Activation Server 440, which is to transmit the obtained identity and MSISDN to the machine. In order to set up such a bearer, which is specific for the transmitting of the obtained identity to the machine, the machine requests the establishment of such a bearer in a Configuration Attach Message 457.

As illustrated in FIG. 3, also FIG. 4 illustrates that the machine 410 also supplies an APN in the Configuration Attach Message 457 to the selected communication network. As described above, the APN indicates to the network what kind of bearer is to be set up, and between which nodes. In this case, a bearer for configuration is requested to be set up between the machine 410 and the Activation Server 440.

The selected communication network 430 knows how to handle the supplied APN. This is illustrated in FIG. 4 by 458. A bearer is established 459 between the machine and the Activation Server. This way, the two parties are able to communicate with each other.

Then the machine 410 starts an activation protocol and sends a Configuration Request Message 460 to the Activation Server. The Configuration Request Message comprises the IDx and the IDx may potentially be encrypted using the PIN. This is performed as in the embodiment described in FIG. 3. In one embodiment, the Configuration Request Message 460 also comprises a string of text, which is to be used to identify the type of machine. This information will then advantageously appear on the bill to the owner in association with the specific costs that have been subsequently generated by actions undertaken by the machine in one or more communication networks.

As for the embodiment described in FIG. 3, the obtained IMSI and MSISDN are transmitted to the machine in a Configuration Response Message 461 and afterwards, the configuration is acknowledged 462 and the connection is released 463 in the same manner as described earlier. After the connection or bearer has been released, the machine may perform a normal attach to the communication network, using the obtained IMSI and credentials.

FIG. 4 also illustrates that a Confirmation Message is sent 464 to the User Equipment which was used to send the Activation Request. The Confirmation Message comprises the obtained IMSI and MSISDN.

FIG. 5 illustrates an embodiment employing network initiated connection, in the control plane. In this embodiment, the Activation Server 540 is operator specific as in the embodiment illustrated in FIG. 4. It is not shared among communication networks as in the embodiment illustrated in FIG. 3.

As described in more detail regarding FIG. 3 and more schematically regarding FIG. 4, this embodiment comprises the same first steps 550-552 as steps 350-352 in FIG. 3. In short and simplified, that is, the User Equipment 520 has been configured with a destination number to the Activation Server 540. The machine 510 is activated 550 and the machine displays its identity IDx and also a PIN code associated with it. The end user enters 551 the IDx and also the PIN code into an SMS. The SMS is sent 552 to the Activation Server 540. As the Activation Server receives the SMS, it knows that the SMS comes from an authenticated User Equipment 520, i.e. the Activation Server 540 knows that the user of the User Equipment 520 is a legitimate user.

At some point in time, independent of steps 551-555, the machine 510 scans the radio environment and displays 557 the communication networks that are heard and/or available. The home network 530 of the User Equipment 520 is selected 558. This is because the Activation Server 540 is operator specific meaning that it is specific for the communication network.

The machine 510 starts monitoring 559 the paging channel of the selected communication network for the TMSI (Temporary Mobile Subscriber Identity) which is the same as the IDx or part of the IDx of the machine 510.

The Activation Server 540, in this embodiment, could resolve the location of the User Equipment, which sent the Activation SMS 552. This is performed in order to limit the number of Core Network nodes which need to be prepared since the end user most likely is or could be restricted to be located in the vicinity of the machine 510. The location can be resolved by using existing interfaces and/or methods. In FIG. 5, this is illustrated by the Activation Server 540 sending a request 553 for obtaining LA/TA (Location Area/Tracking Area) for the User Equipment 520 to the appropriate network node or nodes and receiving the resolved LA/TA 553. Note that the arrow 553 is double-headed, implying that there are at least one signal being sent in each direction, Then the Activation Server 540 initiates a procedure for obtaining an IMSI and MSISDN for the machine. The Activation Server 540 requests 554 allocation of an IMSI, an MSISDN and related information for the machine 510 from the appropriate communication network 530. The appropriate network in this embodiment is the home network of the User Equipment 520, since the Activation Server 540 is implemented within the specific communication network 530. Again, the related information that is requested together with the IMSI and MSISDN is any data which is needed for a SIM/USIM.

The requesting 554 of an IMSI, related information and MSISDN could be done using automated O&M (Operation & Maintenance) interfaces towards the mobile network nodes, for example, such as when allocating a new subscriber in HLR (Home Location Register)/HSS (Home Subscriber Server)/AuC (Authentication Centre). Alternatively, the requesting of an IMSI, related information and MSISDN could be done using new interfaces and/or protocols.

Then the Activation Server 540 receives or obtains 555 the resolved or allocated IMSI, MSISDN and related information, such as credentials.

The Activation Server 540 sends 556 a paging order to a Core Network node in the communication network 530. The paging order comprises the IDx, the PIN, the obtained IMSI, the credentials or related information and MSISDN. If the location of the User Equipment 520 was successfully resolved, the paging order could be sent to those nodes handling that area as a measure to limit the load and signaling. In such a case, the LA/TA is also comprised in the paging order.

The Core Network node receives the paging order and creates 560 a paging message using the IDx formatted like a TMSI. That is, the IDx is shortened to fit into the TMSI parameter.

The paging message is sent to the Radio Access Network node or nodes and is sent 561 out on the paging channel. Normally, a paging message from a Core Network node to a Radio Access Network node comprises both the permanent identity (IMSI) and the temporary identity (TMSI). In this case, the machine has no IMSI. To solve this, the IDx could be sent as the permanent identity.

It shall be noted that the paging message or procedure may or may not be similar to any existing paging messages or procedures. The paging message that is sent may alternatively be a special 'paging for configuration'. This is dependent on the implementation of the invention. It shall also be noted that the paging procedure itself as well as the identities used in the respective paging procedure may differ in different systems, such as in 3G and LTE for example. In case the paging message/procedure in question is similar to an existing paging message/procedure, some temporary identities may need to be used. For example, as the machine is not in possession of an IMSI or any other identity which is valid for authentication and communication, another identity has to be used. Instead of the IMSI, the IDx may be used or a part of the IDx may be used instead as a TMSI. In case a special 'paging for configuration' message or procedure is employed, this message may be designed to make use of only the IDx for example. Such a specially designed paging message and/or procedure will most likely be similar to existing messages and/or procedures, but it can be designed to make use of the whole IDx instead of just a part of it.

As the machine 510 detects the Paging Message comprising the TMSI and/or the IDx of the machine, the machine can establish a connection. The machine sends 562 a Paging Response comprising the IDx of the machine to the Core Network node.

As the Paging Response is received, the Core Network node uses the identity, e.g. the IDx or the TMSI, to find the context related to this session and to the machine. The context comprises the IMSI and related information.

The Core Network node sends 564 the configuration parameters, i.e. the IMSI and related information such as credentials as well as the MSISDN, to the machine in a Configuration Response Message.

Then, the machine 510 confirms 565 the configuration to the Core Network node. The Core Network node confirms 566 to the Activation Server 540 that the machine 510 has been configured. This means that the Activation Server 540 can finalize this task, for example by clearing the task in other Core Network Nodes and not repeat the paging and so on.

Finally, as described in relation to the previous embodiments, the machine 510 releases 567 the connection and may perform a new connection or attach using the received IMSI and credentials.

FIG. 5 also illustrates that a Confirmation Message is sent 568 to the User Equipment which was used to send the Activation Request. The Confirmation Message comprises the obtained IMSI and MSISDN.

Figure 6:
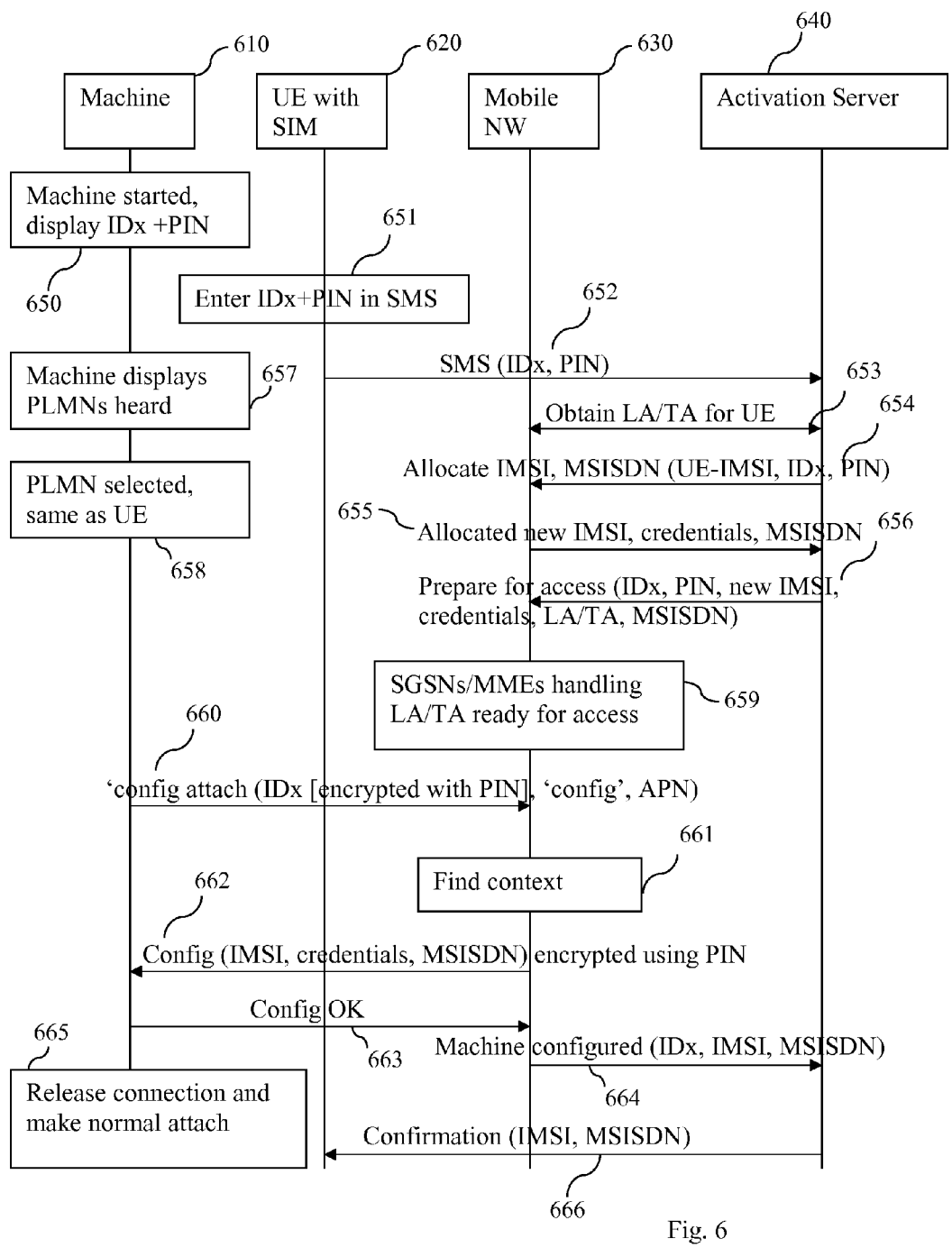
FIG. 6 is a signaling diagram illustrating an embodiment with machine initiated connection in the control plane.

FIG. 6 illustrates an embodiment with machine initiated connection in the control plane. In this embodiment, the Activation Server 640 is operator specific as in the embodiment illustrated in FIGS. 4 and 5. It is not shared among communication networks as in the embodiment illustrated in FIG. 3.

As described in more detail regarding FIG. 3 and more schematically regarding FIGS. 4 and 5, this embodiment in FIG. 6 comprises the same first steps 650-652 as steps 350-352, 450-452, 550-552 in FIGS. 3, 4 and 5 respectively. In short and simplified, that is, the User Equipment 620 has been configured with a destination number to the Activation Server 640. The machine 610 is activated 650 and the machine displays its identity IDx and also a PIN code associated with it. The end user enters 651 the IDx and also the PIN code into an SMS. The SMS is sent 652 to the Activation Server 640. As the Activation Server 640 receives the SMS, it knows that the SMS comes from an authenticated User Equipment 620, the Activation Server 640 knows that the user of the User Equipment is a legitimate user.

The Activation Server 640, also in this embodiment, could resolve 653 the location of the User Equipment 620, which has sent the Activation SMS 652. This is performed in order to limit the number of Core Network nodes which need to be involved since the end user most likely is located in the vicinity of the machine 610. The location can be resolved by using existing interfaces and/or methods. In FIG. 6, this is illustrated by the Activation Server 640 sending a request 653 for obtaining LA/TA (Location Area/Tracking Area) for the User Equipment 620 to the appropriate network node and receiving the resolved LA/TA 653. Note that the arrow 653 is double-headed, implying that there is at least one signal being sent in each direction.

Then the Activation Server 640 initiates a procedure for obtaining an IMSI and an MSISDN for the machine 610. The Activation Server requests 654 an IMSI, an MSISDN and related information for the machine 610 from the appropriate communication network 630. The appropriate network in this embodiment is the home network of the User Equipment 620, since the Activation Server 640 is implemented within the specific communication network 630. Again, the related information that is requested together with the IMSI and the MSISDN is any data that is needed for a SIM/USIM.

The requesting 654 of an IMSI and related information could be done using automated O&M (Operation & Maintenance) interfaces towards the mobile network nodes, for example, such as when allocating a new subscriber in HLR (Home Location Register)/HSS (Home Subscriber Server)/AuC (Authentication Centre). Alternatively, the requesting of an IMSI, the MSISDN and related information could be done using new interfaces and/or protocols.

The new obtained IMSI should also be tied or associated with the IMSI of the User Equipment 620 which sent the Activating SMS 652. Also the MSISDN should be tied or associated with the obtained IMSI. If a string of text was entered in the Activation Request or in the Configuration Request Message, this string of text may also be used when the different associations or ties between the User Equipment, the obtained IMSI and MSISDN are performed.

Then the Activation Server 640 receives or obtains 655 the resolved or allocated IMSI, the MSISDN and related information, such as credentials.

The Activation Server 640 sends an order 656 to prepare for a connection of the machine 610 to a Core Network node in the communication network 630. The preparation order comprises the IDx, the PIN, the obtained IMSI, the credentials or related information as well as the MSISDN. If the location of the User Equipment 620 was successfully resolved, the preparation order could be sent to those nodes handling that area as a measure to limit the load and signaling. In such a case, the LA/TA is also comprised in the preparation order.

The Core Network node or nodes receive the preparation order and prepare 659 a 'context' for the received IDx and store the received IMSI and related information in the context together with the MSISDN.

The machine scans 657 the radio environment and displays the communication networks that are heard and/or available. The home network 630 of the User Equipment 620 is selected. This is because the Activation Server 640 is operator specific, meaning that it is specific for the communication network.

The machine performs 660 a configuration attach on the selected network, by sending 660 a 'config attach' message to the communication network 630. The 'config attach' message comprises the IDx, which may optionally be encrypted using the PIN.

The Core Network Node uses the IDx to find the context related to this session or machine 661.

The Core Network Node sends 662 the configuration parameters, i.e. the IMSI, credentials and the MSISDN for example, to the machine 610.

Then the machine 610 confirms 663 the configuration to the Core Network node. The Core Network node confirms 664 to the Activation Server 640 that the machine 610 has been configured. This means that the Activation Server 640 can finalize this task, for example to clear the task in other Core Network nodes.

Finally, as described in relation to the previous embodiments, the machine 610 releases 665 the connection and may perform a new connection or attach using the received IMSI and credentials.

FIG. 6 also illustrates that a Confirmation Message is sent 666 to the User Equipment which was used to send the Activation Request. The Confirmation Message comprises the obtained IMSI and MSISDN.

For all the embodiments described above, in case the machine needs to be reconfigured, the machine could be reset to factory defaults so that the obtained IMSI, MSISDN and credentials are erased from a memory of the machine. Then the procedure may be performed again by sending an Activation SMS to a communication network as described above.

This may be necessary e.g. if the machine is sold or given away so that another owner or end user is in possession of the machine.

FIGS. 3-6 merely discloses non-limiting embodiments of the procedure. According to another exemplary embodiment, the Activation Request, comprising the machine identity, will in itself be an indication to the Activation Server that both a valid identity and a telephone number are requested. In this exemplary embodiment, the Configuration Request which is sent from the machine to the Activation Server may further comprise an indication to the Activation Server that both a valid identity and a telephone number are requested. Alternatively, the Configuration Request will indicate to the Activation Server that only a valid identity is requested. In that case, the obtained telephone number will not be sent or transmitted to the machine.

Figure 7:
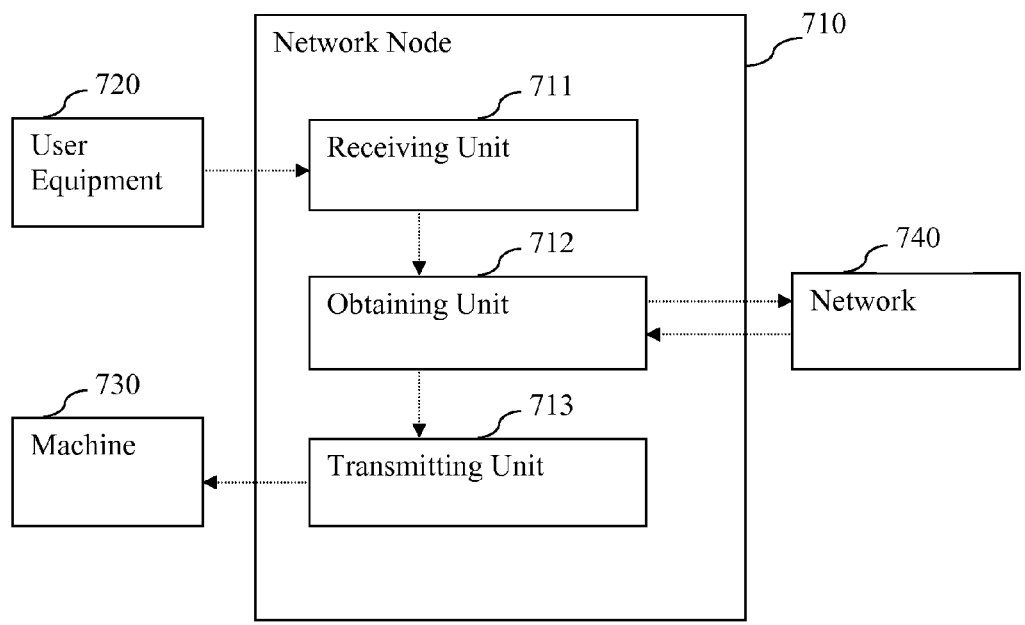
FIG. 7 is a schematic block diagram illustrating an embodiment of an Application Server adapted for obtaining/assigning/resolving an identity for a machine.

FIG. 7 is a schematic block diagram illustrating an embodiment of a Network Node 710 adapted for obtaining an identity for a machine 730, which identity is valid for authentication and communication in one or more communication networks. It shall be noted that the Network Node corresponds to the Activation Server which has been described above.

The Network Node shown in FIG. 7 comprises a receiving unit 711 adapted for receiving an Activation Request comprising a machine identity of the machine 730, which Activation Request is sent from a User Equipment 720, which User Equipment has an identity which is valid in a communication network and which User Equipment is authenticated in the communication network. The Network Node further comprises an obtaining unit 712 adapted for requesting and obtaining an identity which is valid in the communication network and related information for the machine from the communication network 740 on the basis of the activation request being received from a User Equipment having a valid identity and being authenticated in the communication network. Also, the Network Node comprises a transmitting unit 713 for transmitting the obtained identity to the machine 730.

According to an embodiment, the identity which is valid in a communication network is an IMSI.

In one example, the machine identity is a MAC address or an IMEI.

According to one embodiment, the Activation Request is an SMS message.

The Network Node 710 may be provided with different features to enhance security and/or optimize resource usage. For example, the Network Node could restrict connections to only be allowed for a certain time. When that time expires, the Network Node releases the obtained data, such as the new IMSI and clears out any other allocated resources related to the machine identity, IDx.

It shall be noted that the Network Node may be implemented in one specific node but it may as well be implemented in a distributed manner in several network nodes.

According to an embodiment, the Activation Request can indicate a request for a telephone number, such as an MSISDN. In such a case, the obtaining unit 712 is further adapted to request and obtain a telephone number for the machine.

Figure 8:
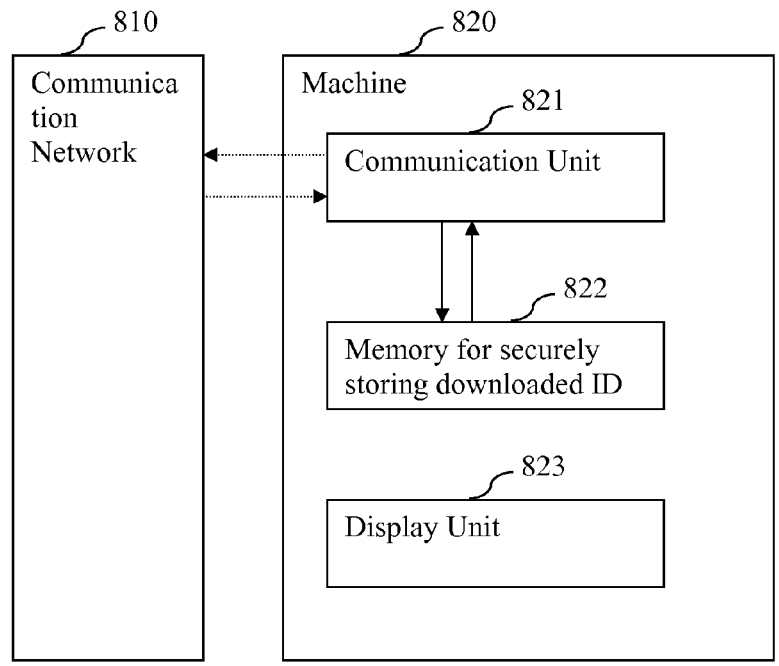
FIG. 8 is a schematic block diagram illustrating an embodiment of a machine adapted to receive a downloadable identity.

FIG. 8 is a schematic block diagram illustrating an embodiment of a machine 820 adapted to receive a downloadable identity.

As shown in FIG. 8, the machine 820, adapted to receive a downloadable identity, which identity is valid in a communication network, comprises a communication unit 821 and a memory 822 for securely storing the downloaded identity. The machine also has a (unique) machine identity, wherein the machine is adapted to display 823 the machine identity, and to communicate with the network to receive an identity which is valid in the communication network.

As the machine 820 receives the obtained or allocated identity, the identity has to be securely stored in a memory 822 within the machine 820 so that the identity is safe and protected from tampering with, from cloning or from being abused in other ways.

According to an embodiment, the downloadable identity which is valid in a communication network is an IMSI.

In one example, the machine identity is a MAC address or an IMEI.

In one example, the machine 820 is further adapted to receive a downloadable telephone number, such as an MSISDN.

It should be noted that FIGS. 7 and 8 merely illustrate various functional units in the Network Node 710 and the Machine 820, respectively, in a logical sense. However, the skilled person is free to implement these functions in practice using any suitable software and hardware means. Thus, the invention is generally not limited to the shown structures of the Network Node 710 and the Machine 820 and the functional units 711, 712, 713, 821, 822, 823.

While the invention has been described with reference to specific exemplary embodiments, the description is generally only intended to illustrate the inventive concept and should not be taken as limiting the scope of the invention. The invention is defined by the appended claims.

The invention claimed is:

1. A method in a network node of a communication network for enabling communication between a machine and said communication network, the method comprising:
   receiving an Activation Request from a User Equipment, which User Equipment has an identity which is valid in said communication network and which User Equipment is authenticated in said communication network, said Activation Request comprising a machine identity for said machine,
   obtaining an identity which is valid in said communication network for said machine and a telephone number for the machine, on the basis of said Activation Request being received from a User Equipment having a valid identity and being authenticated in said communication network, the telephone number differing from a telephone number for the User Equipment;
   transmitting said obtained identity to said machine for enabling said machine to subsequently authenticate itself in one or more communication networks using said obtained identity.

2. The method of claim 1, wherein said identity being valid in a communication network is an IMSI.

3. The method of claim 1, wherein said machine identity is a MAC address or an IMEI.

4. The method of claim 1, wherein said Activation Request is an SMS message.

5. The method of claim 1, wherein a telephone number is also requested in said Activation Request.

6. The method of claim 1, wherein said method is performed by an Activation Server in said communication network.

7. The method of claim 1, wherein said transmitting of said obtained identity to said machine comprises sending a Configuration Response Message comprising said identity to said machine.

8. The method of claim 1, wherein said transmitting of said obtained identity to said machine further comprises sending, to said machine, the telephone number obtained together with said identity.

9. The method of claim 1, further comprising said communication network receiving a Configuration Attach Message from said machine indicating a request for configuration from said machine, said Configuration Attach Message comprising said machine identity.

10. The method of claim 9, further comprising said communication network receiving a PDP Context Activation for configuration bearer service.

11. The method of claim 9, wherein said Configuration Attach Message indicates both Attach Type and Request Type to be 'Configuration' and comprises an APN.

12. The method of claim 9, wherein said communication network is selected by the machine scanning a radio environment and selecting an available communication network.

13. The method of claim 9, wherein said communication network is selected by a user of said User Equipment, said selected communication network being a home network of said User Equipment.

14. The method of claim 9, further comprising establishing a bearer between said machine and said Activation Server.

15. The method of claim 1, wherein said Activation Request comprises a string of text to be associated with said obtained identity or with the telephone number, or both.

16. The method of claim 7, further comprising receiving a Configuration Request Message from said machine, said Configuration Request Message comprising said machine identity, or a version of said machine identity encrypted using a PIN, which PIN was comprised in said Activation Request.

17. The method of claim 16, wherein, after said obtaining an identity which is valid in said communication network is complete, transmitting said obtained identity to said machine by sending a Configuration Response Message, comprising said identity, to said machine.

18. The method of claim 1, further comprising, after said identity which is valid in said communication network has been obtained in said communication network:
sending a Paging Message on a paging channel, said Paging Message comprising said machine identity, and when a Paging Response from said machine, having said machine identity as in said Paging Message, is received, transmitting said obtained identity to said machine.

19. The method of claim 1, further comprising associating said machine to said User Equipment in such a way that any subsequent chargeable communication or activity between said machine and said communication network is billed to an owner of said User Equipment.

20. The method of claim 1, further comprising sending a Confirmation Message to said User Equipment from which said Activation Request was received, said Confirmation Message comprising said obtained identity which is valid in said communication network for said machine or a telephone number obtained together with said obtained identity, or both.

21. The method of claim 1, wherein said Activation Request or said Configuration Request message, or both, comprise a string of text to be associated with said obtained identity or with a telephone number obtained together with said obtained identity, or both.

22. A Network Node adapted for obtaining an identity for a machine, said identity being valid in a communication network, said Network Node comprising:
a receiving unit adapted for receiving a Activation Request comprising a machine identity, said Activation Request being sent from a User Equipment, which User Equipment has an identity valid in a communication network and which User Equipment is authenticated in said communication network;
an obtaining unit adapted for requesting and obtaining an identity which is valid in said communication network, a telephone number for the machine, and related information for said machine from said communication network on the basis of said Activation Request being received from a User Equipment having a valid identity and being authenticated in said communication network, wherein the telephone number for the machine differs from a telephone number for the User Equipment; and
a transmitting unit for transmitting said obtained identity to said machine.

23. The Network Node of claim 22, wherein said identity being valid in a communication network is an IMSI.

24. The Network Node of claim 22, wherein said machine identity is a MAC address or an IMEI.

25. The Network Node of claim 22, wherein said Activation Request is an SMS message.

* * * * *

UNITED STATES PATENT AND TRADEMARK OFFICE
CERTIFICATE OF CORRECTION

PATENT NO. : 9,241,232 B2
APPLICATION NO. : 13/636721
DATED : January 19, 2016
INVENTOR(S) : Nylander et al.

It is certified that error appears in the above-identified patent and that said Letters Patent is hereby corrected as shown below:

On the Title Page, Item (75), under "Inventors", in Column 1, Line 3, delete "Gudmundson," and insert -- Gudmundsson, --, therefor.

Signed and Sealed this
Twenty-third Day of August, 2016

Michelle K. Lee
*Director of the United States Patent and Trademark Office*